(12) United States Patent
Konno

(10) Patent No.: US 6,282,431 B1
(45) Date of Patent: Aug. 28, 2001

(54) TIME CORRECTING METHOD AND PORTABLE REMOTE TELEPHONE TERMINAL IN WHICH TIME IS CORRECTED IN ACCORDANCE WITH SUCH METHOD

(75) Inventor: Masahiro Konno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/162,850

(22) Filed: Sep. 29, 1998

(30) Foreign Application Priority Data

Oct. 28, 1997 (JP) .................................................. 9-295089

(51) Int. Cl.[7] .............................. H04B 1/38; H04M 1/00; H04Q 7/20; G04B 19/22; G04C 11/02
(52) U.S. Cl. ...................... 455/550; 455/566; 455/432; 368/21; 368/47
(58) Field of Search .................................. 455/550, 432, 455/566, 418, 419, 422, 425, 552, 556; 368/21, 22, 47

(56) References Cited

U.S. PATENT DOCUMENTS

| | | | |
|---|---|---|---|
| 4,204,167 | * 5/1980 | Liu | 455/231 |
| 5,319,374 | * 6/1994 | Desai et al. | 342/387 |
| 5,363,377 | * 11/1994 | Sharpe | 370/314 |
| 5,375,104 | * 12/1994 | Ishii et al. | 368/22 |
| 5,590,092 | * 12/1996 | Fehnel | 368/10 |
| 5,655,218 | * 8/1997 | Smolinske | 455/566 |
| 5,739,762 | * 4/1998 | Kuramatsu et al. | 340/825.21 |
| 5,740,129 | * 4/1998 | Frampton | 368/10 |
| 5,845,198 | * 12/1998 | Bamburak et al. | 455/31.1 |
| 5,920,824 | * 7/1999 | Beatty et al. | 455/550 |
| 5,995,846 | * 11/1999 | Jakobsen | 455/517 |

* cited by examiner

Primary Examiner—Nay Maung
Assistant Examiner—Ray Persino
(74) Attorney, Agent, or Firm—Helfgott Karas, P.C.

(57) ABSTRACT

A time correcting method includes steps of receiving notifying information from a base station, the notifying information including an identification number identifying the base station, selecting a time differential information item corresponding to the identification number from a table which indicates a relationship between identification numbers identifying base stations and time differential information items in service areas of the respective base stations, and correcting a present time using the selected time differential information item.

13 Claims, 8 Drawing Sheets

FIG.7

| FIELD | LENGTH(BITS) |
|---|---|
| MSG_TYPE ('00000001') | 8 |
| P_REV | 8 |
| MIN_P_REV | 8 |
| SID | 15 |
| NID | 16 |
| PILOT_PN | 9 |
| LC_STATE | 42 |
| SYS_TIME | 36 |
| LP_SEC | 8 |
| LTM_OFF | 6 |
| DAYLT | 1 |
| PRAT | 2 |
| CDMA_FREQ | 11 |

TIME CORRECTING METHOD AND PORTABLE REMOTE TELEPHONE TERMINAL IN WHICH TIME IS CORRECTED IN ACCORDANCE WITH SUCH METHOD

BACKGROUND OF THE INVENTION

1. Field of the Invention

The present invention relates to a time correcting method of automatically correcting a time of a timer and a portable remote telephone terminal having a timer in which a time is corrected in accordance with the time correcting method.

2. Description of the Related Art

In general, a portable remote telephone terminal has a timer indicating the present time. In a case where a user having such a portable remote terminal moves in areas between which there is a difference in time, it is preferable that the time of the timer is easily corrected.

The portable remote telephone terminal has a constitution corresponding to types of service systems. There are an analog system and a digital system as the types of service systems. As the analog system, an AMPS (Advanced Mobile Phone Service) system, a TACS (Total Access Communications System) and an NTT system have been known. As the digital system, a PDC (Personal Digital Cellular) of a TDMA system, a GSM (Global System for Mobile Communications), and an IS-95 (cdmaOne) of a CDMA (Code Division Multiple Access) system have been known.

The portable remote telephone terminal has a timer and the present time is indicated in a display unit. When a user uses the portable remote telephone terminal for the first time, the user initially sets the present time of the timer. The portable remote telephone terminal in which a calling time period can be indicated by using a function of the timer has been known. A base station for the portable remote telephone services supplies various types of information to portable remote telephone terminals in a service area.

The portable remote telephone service system is formed so as to be capable of supplying services in a wide area. As a result, an area in which a user of the remote portable telephone terminal can move is expanded. A user having the remote portable telephone terminal may move from one area to another area between which areas there is the difference in time. For example, there is one hour difference between Chicago and New York. Thus, in a case where a user sets the time of the portable remote telephone terminal in New York and then moves to Chicago, the time obtained in the portable remote telephone terminal differs from the actual local time in Chicago.

Due to an automatic answering/recording function of the personal remote telephone terminal, a receiving time at which a message is received is recorded with the message. If the time obtained in the portable remote telephone terminal is not correct based on the difference in time, the receiving time recorded in the portable remote telephone terminal is not correct. In addition, in a case where times at which data is transmitted and received are recorded, the recorded times may not be corrected. Thus, every time the user having the portable remote telephone terminal moves in areas between which there is the difference in time, the user has to do an operation for resetting the timer of the portable remote telephone terminal to the local time. The operation is troublesome for a user who frequently moves in areas between which there is the difference in time.

SUMMARY OF THE INVENTION

Accordingly, a general object of the present invention is to provide a novel and useful time correcting method and a portable remote telephone terminal using the time correcting method in which the disadvantages of the aforementioned prior art are eliminated.

A specific object of the present invention is to provide a time correcting method by which a time is automatically corrected to a local time when a user of a remote portable telephone terminal moves in areas between which there is a difference in time.

The above objects of the present invention are achieved by a time correcting method comprising steps of: (a) receiving notifying information from a base station, the notifying information including an identification number identifying the base station; (b) selecting a time differential information item corresponding to the identification number from a table which indicates a relationship between identification numbers identifying base stations and time differential information items in service areas of the respective base stations; and (c) correcting a present time using the time differential information item selected in step (b).

Another object of the present invention is to provide a portable remote telephone terminal in which the time is corrected in accordance with the above time correcting method.

The object of the present invention is achieved by a portable remote telephone terminal which receives notifying information from a base station and has a timer, the notifying information including an identification number identifying the base station, comprising: a table indicating a relationship between identification numbers identifying base stations and time differential information items in service areas of the respective base stations; selecting means for selecting a time differential information item corresponding to the identification number included in the received notifying information from the table; and correcting means for correcting a present time of the timer using the time differential information item selected by the selecting means.

According to the present invention, the table indicating the relationship between identification numbers identifying base stations and time differential information items in service areas of the respective base stations is used. When an identification number included in the notifying information is transmitted from a base station, the present time is corrected using a time differential information item indicated in the table as a time differential information item corresponding to the received identification number. Thus, the present time can be automatically corrected to a local time even if a user of a remote portable telephone terminal moves in areas between which there is the difference in time.

In addition, the above objects are also achieved by a portable remote telephone terminal which receives notifying information from a base station, has a timer and functions in a dual mode, the dual mode being a mode in which a first system supplying time information and a second system not supplying the time information are selectable, the portable remote telephone terminal comprising: a table indicating a relationship between identification numbers identifying base stations and time differential information items in service areas of the respective base stations, each of the time differential information items being a difference between a standard time and a local time in a corresponding one of the service areas of the respective base stations; a register storing time difference information indicating a difference between a present time set in the timer and the standard time; a receiving unit receiving the time information supplied in the first system to which the second system selected immediately after turning on a power supply is switched; a time setting unit setting a present time based on the time information received by the receiving unit; a mode switch-back unit switching the first system back to the second system; a selecting unit selecting from the table a time differential information item corresponding to the identification number included in the notifying information received in the second system; and a correcting unit for correcting a present time of the timer using a difference between the time difference information item selected by the selecting unit and the time differential information stored in the register.

According to the above portable remote telephone terminal, in the dual mode in which the first system supplying the time information, such as the CDMA system, and the second system not supplying the time information, such as the AMPC system are selectable, the present time can be corrected to a local time.

BRIEF DESCRIPTION OF THE DRAWINGS

Other objects, features and advantages of the present invention will be apparent from the following description when read in conjunction with the accompanying drawings, in which:

FIG. 7 is a diagram illustrating a message format in a CDMA system; and

DESCRIPTION OF THE PREFERRED EMBODIMENTS

A description will be given of an embodiment of the present invention.

Figure 1:
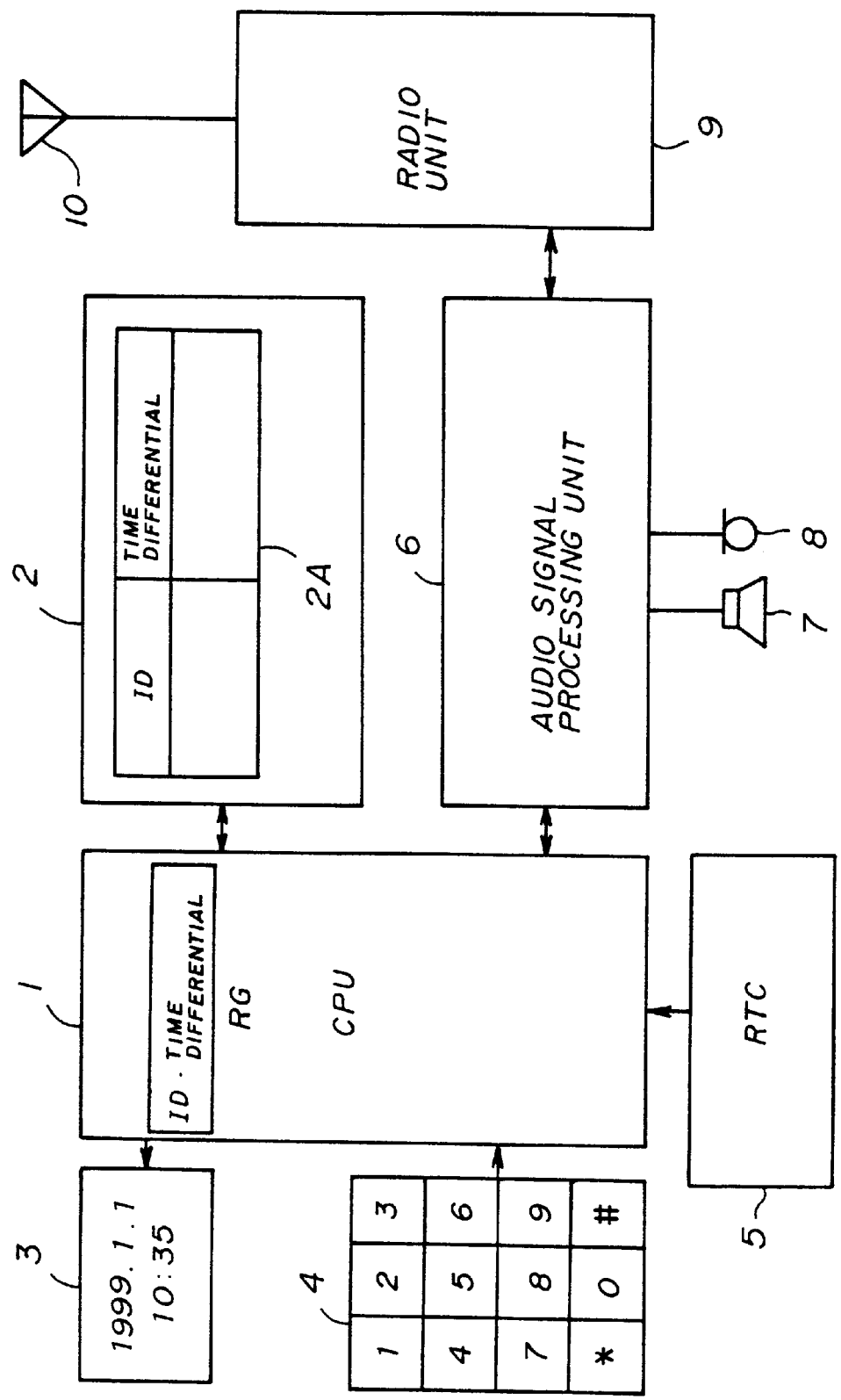
FIG. 1 is a block diagram illustrating a portable remote telephone terminal according to an embodiment of the present invention.

A portable remote telephone terminal according to an embodiment of the present invention is formed as shown in FIG. 1. Referring to FIG. 1, the portable remote telephone terminal has a processor (CPU) 1, a memory unit 2, a time differential table 2A, a display unit 3, an input operation unit 4, a real time clock (RTC) unit 5, an audio signal processing unit 6, a speaker 7, a microphone 8, a radio unit 9, an antenna 10 and a register unit RG. The register RG is located in the processor 1. However, the register RG may be located in the memory 2.

The processor 1 has an operating processing function for receiving and extracting an identification number, accessing the time differential table 2A, correcting and setting a time of the real time clock unit 5 and setting a mode in a dual mode system. The memory unit 2 is formed of semiconductor integrated circuit memories. The memory unit 2 stores various kinds of data and programs and the time differential table 2A. The time differential table 2A indicates time differential information items corresponding to identification (ID) numbers identifying areas. A time differential information item corresponding to an identification (ID) number is read out of the time differential table 2A and set in the register RG. The processor 1 automatically carries out time correction based on the time differential information item. The display unit 3 is formed of a liquid crystal display panel. The display unit 3 is controlled by the processor 1 so that a time, a date and a dialing number are displayed therein.

The input operation unit 4 has ten keys. Other function keys may be included in the input operation unit 4. The input operation unit 4 is used to input a dialing number in a calling operation and perform various setting operations. The audio signal processing unit 6 processes audio signals supplied from the microphone 8 and has functions for supplying received audio signals to the speaker 7 and reproducing voices based on the audio signals. The radio unit 9 has a modulation-and-demodulation function corresponding to the TDMA system or the DMA system so that the transmitting and receiving operations are carried out. The radio unit 9 may have functions corresponding to both the TDMA and DMA systems in a dual mode. In the case of the dual mode, the system is switched between the TDMA system and the DMA system.

An identification (ID) number is uniquely assigned to a base station or a system. Notifying information is transmitted from the base station to portable remote telephone terminals in a service area so that the portable remote telephone terminals are informed of the identification (ID) number. In the U.S., the relationship between identification numbers and base stations or systems is indicated in the telephone directory (The Cellular Telephone Directory) issued by the Communication Publishing Service. In the telephone directory, system identification numbers of the portable remote telephone services in various places in the U.S. are indicated along with maps of services areas for the respective services. For example, the system identification number of the system A in Los Angeles is "00027" and the system identification number of the system B is "00002".

In a case where there are different portable remote telephone services in the same place, different identification numbers are assigned to the respective remote telephone services as the system A and the system B. The identification numbers are generally known. Thus, an area in which a user having a portable remote telephone terminal is present can be identified by the system identification number. The time differential in each area with respect to the standard time is known. Thus, the time differential information items corresponding to the respective identification numbers are indicated in the time differential table 2A.

Figure 2:
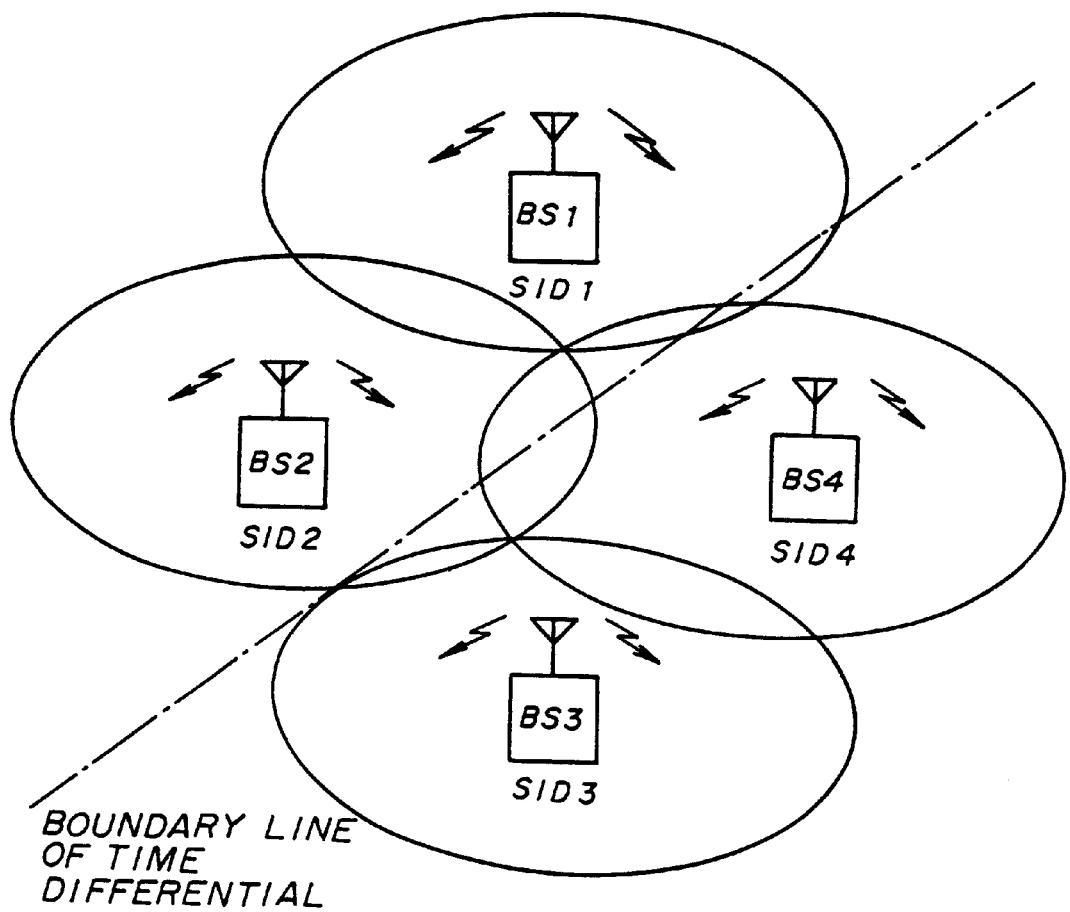
FIG. 2 is a diagram illustrating a portable remote telephone service.

For example, the portable remote telephone service systems are formed as shown in FIG. 2. Base stations BS1–BS4 are assigned with identification numbers SID1–SID4. Between service areas of the base stations BS1 and BS4 and between the service areas of the base stations BS2 and BS3, a boundary line, shown by a chain line, of the time differential is positioned. In this case, when a user having a portable remote telephone terminal moves from the service area of the base station BS1 to the service area of the base station BS4 or from the service area of the base station BS2 to the service area of the base station BS3, the local time is changed based on the difference in time between the service areas. The system identification number SID4 or SID3 of the service area to which the user moves is received by the portable remote telephone terminal, and the time differential information corresponding to the system identification number SID4 or SID3 is read out of the time differential table 2A. The present time obtained in the portable remote telephone terminal can be corrected using the time differential information.

In the time differential table 2A, the time differential information items corresponding to the system identification numbers SID1 and SID2 have the same value and the time differential information items corresponding to the system identification numbers SID3 and SID4 have the same value. However, the time differential information items corresponding to the system identification numbers SID3 and SID4 differ from that corresponding to the system identification number SID1.

When the portable remote telephone terminal receives a new system identification number, the time differential table 2A is retrieved so that the time differential information corresponding to the new system identification is read out. The new time differential information item is compared with the time differential item set in the register RG (see FIG. 1). Based on the comparing result, it can be determined whether the user of the portable remote telephone terminal has moved from one area to another area between which areas there is the difference in time. If there is the difference in time between the areas, the time correction is carried out based on the difference in time.

In a case where the user moves in zigzags so as to repeatedly cross the time differential line, the time correction has to be repeatedly carried out. In this case, the time correction may be carried out in the following procedure.

Each time at which the time correction should be carried out is recorded in a register. The previous time stored in the register and the present time which should be stored in the register are compared. If the difference between the previous time and the present time is not greater than a predetermined time period, the time correction is paused. After a predetermined time elapses, if it is determined, based on the time differential information, that the time correction should be carried out, the time correction is carried out.

Figure 3:
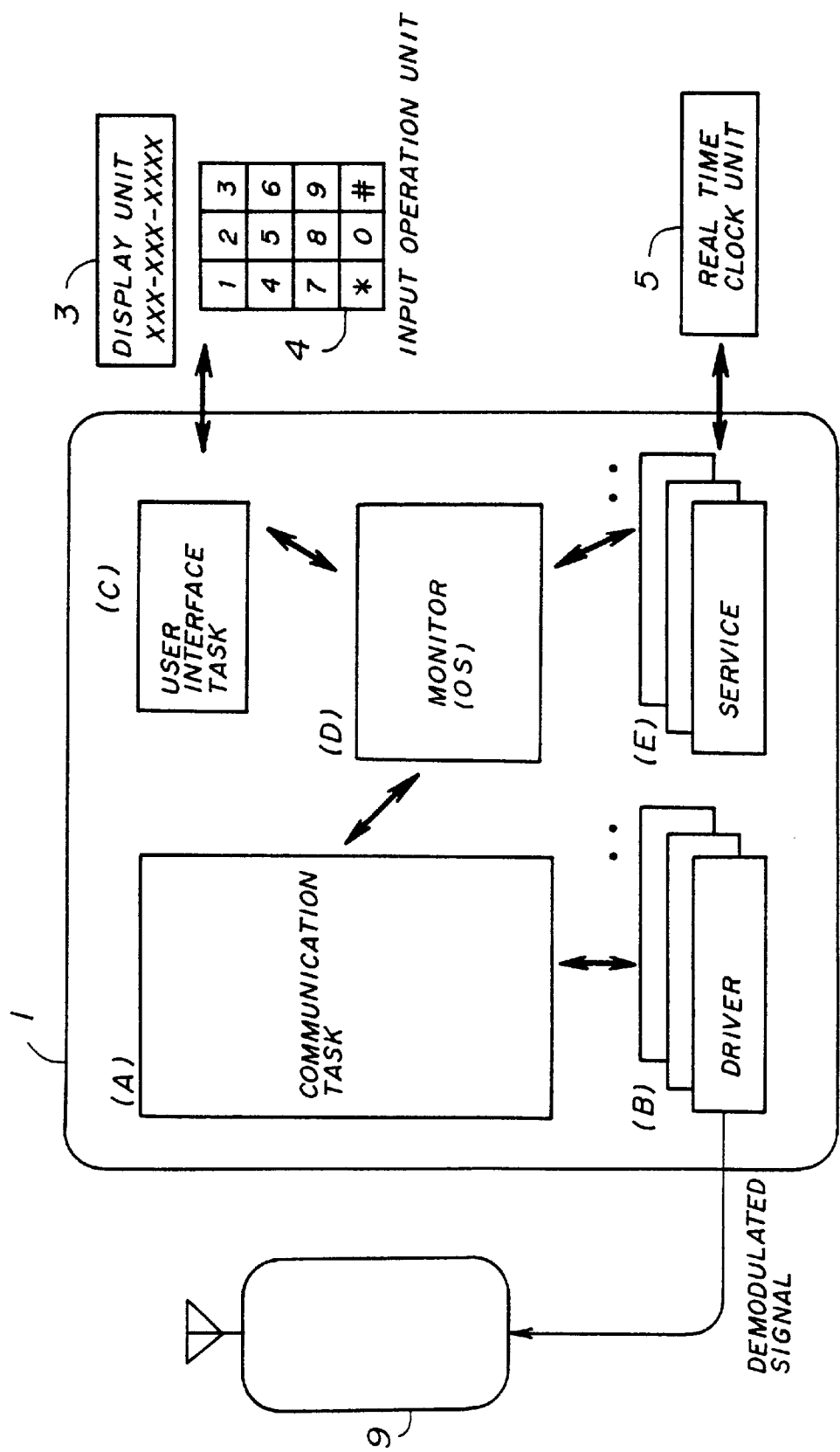
FIG. 3 is a block diagram illustrating a structure of software in the portable remote telephone terminal according to the embodiment of the present invention.

The software in the portable remote telephone terminal is formed as shown in FIG. 3. In FIG. 3, those parts which are the same as those shown in FIG. 1 are given the same reference numbers.

Referring to FIG. 3, the software for the CPU 1 includes a communication task (A), various drivers (B), a user interface task (C), a monitor (OS) (D) and various services (E). For example, notifying information of the AMPS system is demodulated by the radio unit 9. The demodulated signals are supplied to a process of the communication task (A) via the various drivers (B) which are interfaces between the hardware and the software.

The communication task (A) analyzes messages and an identification number included in the notifying information. The analyzing result is supplied to the monitor (OS), so that the time differential table 2A is checked and it is determined, based on the identification number, whether there is the difference in time. If there is the difference in time, the real time clock unit 5 is controlled by the various control functions of the services (E) so that the time correction is carried out. The display unit 3 is caused by the monitor (OS) via the user interface task (C) to display various information items. Input data from the input operation unit 4 is transmitted to the monitor (OS) via the user interface task (C). A calling dial number is supplied to the communication task (A) and the display unit 3 via the user interface task (C). The calling dial number is displayed by the display unit 3.

Figures 4A, 4B:
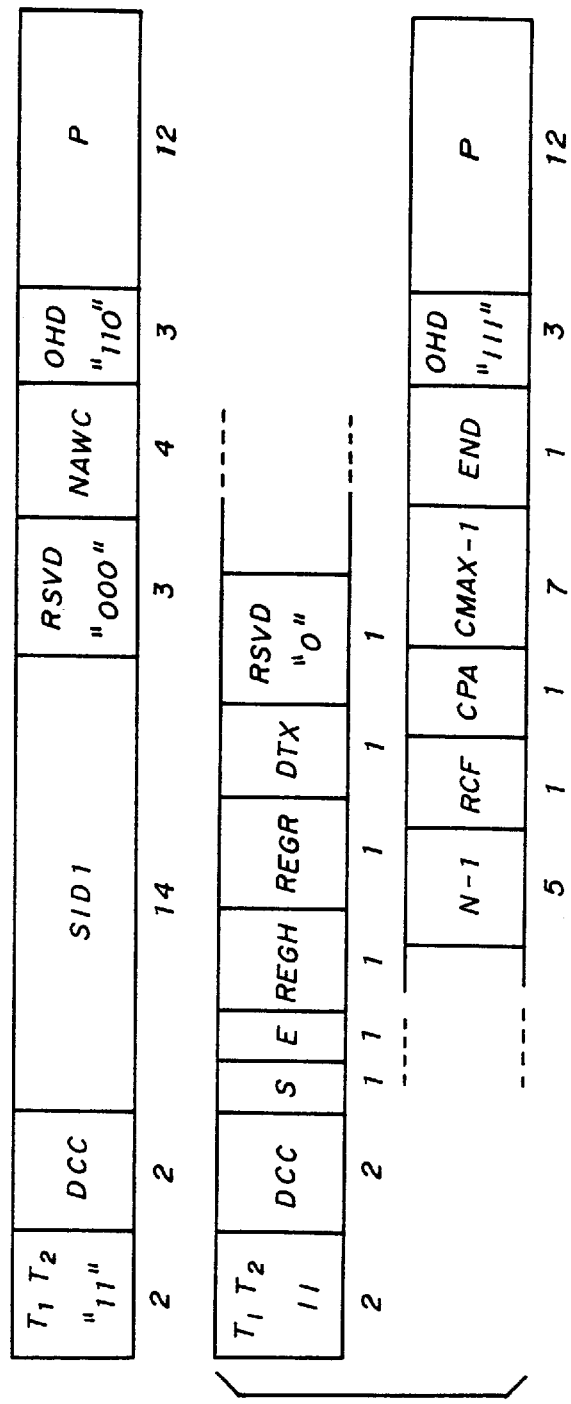
FIGS. 4A and 4B are diagrams illustrating a system parameter overhead message.

A system parameter overhead message having a two-word format in the AMPS system is formed as shown in FIGS. 4A and 4B. FIG. 4A shows a first word and FIG. 4B shows a second word. In FIGS. 4A and 4B, each of numbers under respective fields of the first and second words is a number of bits. T1 and T2 located in the head of each of words is a type field. The type field of "11" represents the overhead word. DCC is a digital color code field, SID1 is a first system identification number field, RSVD is a free field, and NAWC is an additional word field.

In addition, OHD is an overhead message type field. The OHD having "110" represents the first word and the OHD having "111" represents the second word. P is a parity field, S is a serial number field, E is an extended address field, REGH is a register field as a home mobile unit, REGR is a register field as a roaming mobile unit, DTX is a discontinuity transmission field, N-1 is a paging channel field, RCF is a reading control field, CPA is a paging/access field, CMAX-1 is an access channel field and END is an end display field. The END having "0" indicates that that the word is not the last word. The END having "1" indicates that the word is the last word.

The portable remote telephone terminal in the AMPS system receives the system parameter overhead message as described above. A system identification number is then extracted from the system identification number field SID1 of the system parameter overhead message. The time differential table 2A (see FIG. 1) is retrieved, and it is determined whether there is the difference in time between an area from which the user moves and an area to which the user moves. If there is the difference in time between the areas, the processor 1 controls the real time clock unit 5 so that the time correction is carried out.

Figure 5:
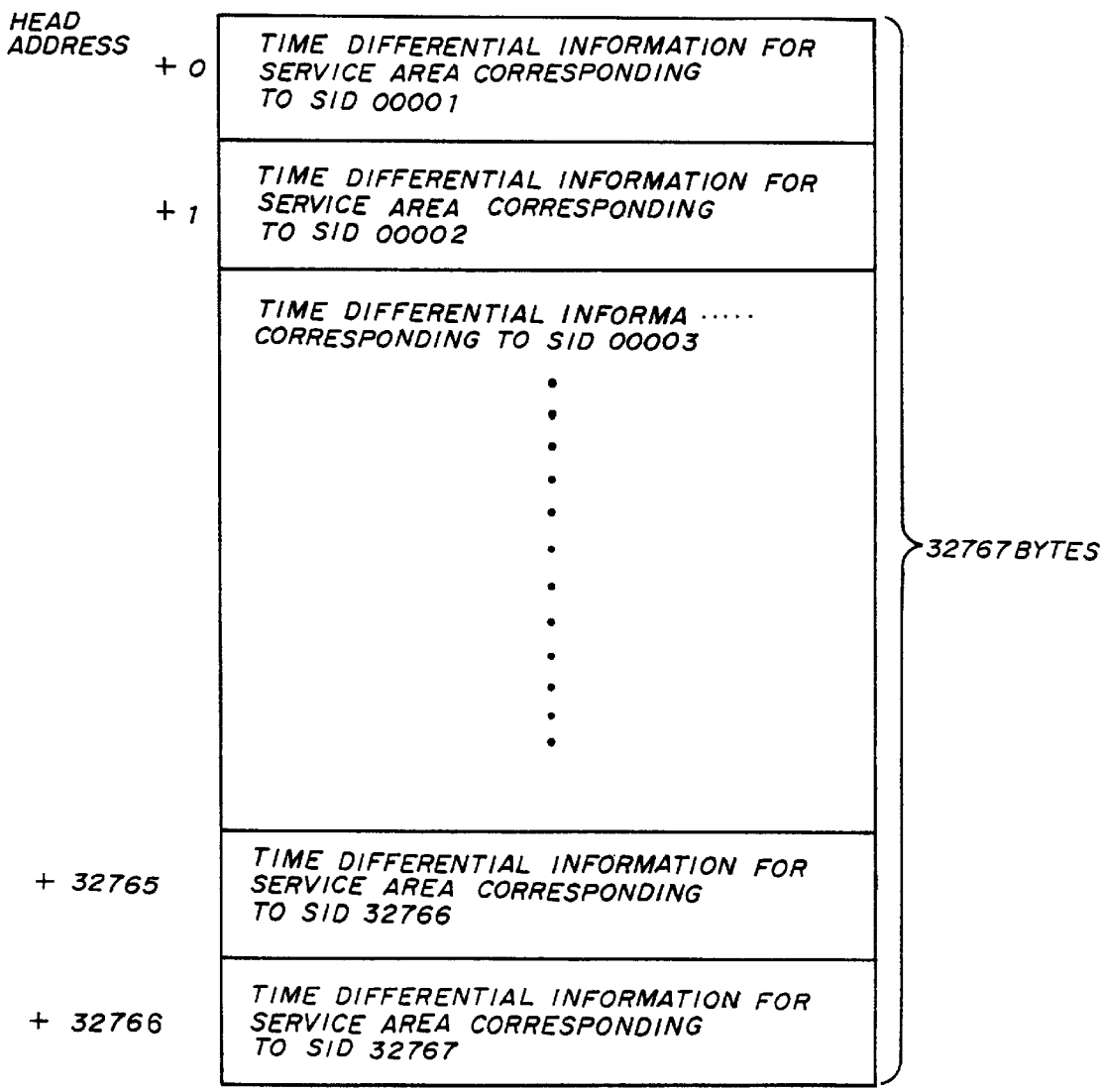
FIG. 5 is a diagram illustrating a time differential table used in the portable remote telephone terminal according to the embodiment of the present invention.

The time differential table is formed as shown in FIG. 5. Referring to FIG. 5, at a 0-address (the head address), the time differential information, with respect to the standard time, in an service area corresponding to a system identification number SID 00001, at a 1-address, the time differential information in a service area corresponding to a system identification number SID 00002, . . . , and for example, at a 32766-address, the time differential information in a service area corresponding to a system identification number SID 32767 are respectively stored in the time differential table 2A.

Each system identification number and corresponding time differential information may be stored in the time differential table 2A. Using a conversion table indicating the relationship between system identification numbers and addresses at which the system identification numbers are stored in the time differential table 2A, the time differential table 2A can be accessed.

The time differential table 2A may be formed in a read-only memory (ROM), an electrically erasable programmable ROM (EEPROM) or a random access memory (RAM) with a backup battery. A register 2B stores the difference between the present setting time and the standard time. The register 2B is used in the same manner as the register RG in the processor 1 shown in FIG. 1.

Figure 6:
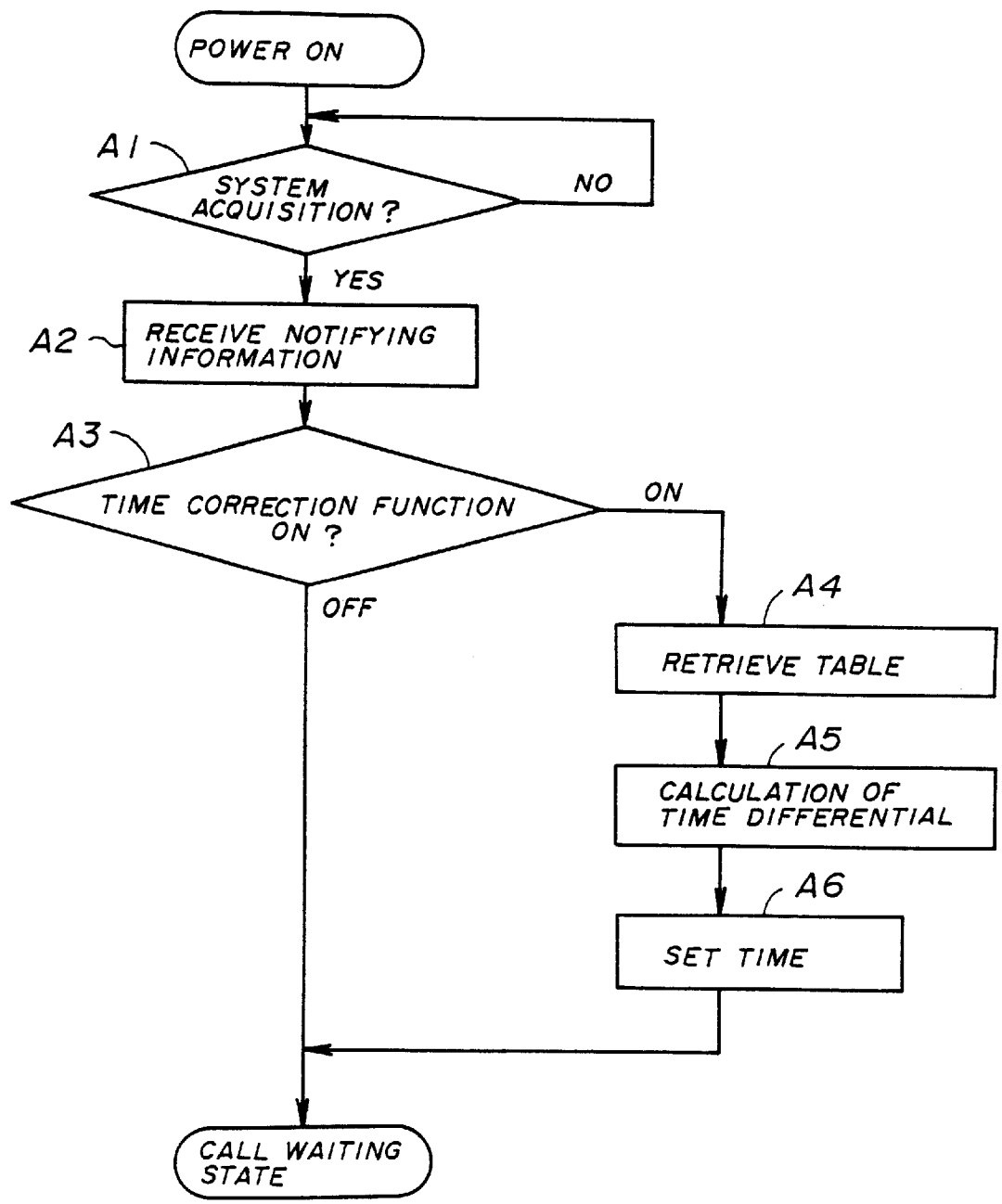
FIG. 6 is a flowchart illustrating a first example of a process carried out in the portable remote telephone terminal.

A first example of a process is carried out in accordance with a procedure as shown in FIG. 6. Referring to FIG. 6, after the power supply is turned on, that is, after a power switch of the portable remote telephone terminal is turned on, it is determined that the system acquisition has been established (A1). If the system acquisition has been established, the notifying information is received (A2). It is then determined whether the time correcting function is in an active state in the portable remote telephone terminal (A3). If the time correcting function is not in the active state, the portable remote telephone terminal becomes in a call waiting state. On the other hand, if the time correcting function is in the active state, the time differential table 2A is retrieved (A4) and the time differential calculation is carried out (A5). The time correction is carried out based on the result of the time differential calculation (A6).

For example, if the system identification number SID received by the portable remote telephone terminal is equal to 00002, the time differential information is read out from the address-1 of the time differential table 2A (see FIG. 5). If the time differential information read out from the time differential table 2A is equal to +3 and the time differential between the present setting time stored in the register 2B and the standard time is equal to +2, the difference between the time differential set in the terminal and the time differential (read out from the time differential table 2A) which should be set is +1. Thus, for example, if the present time obtained in the portable remote telephone terminal is 15:00, +1 is added to the present time so that the present time obtained in the portable remote telephone terminal is corrected to 16:00. At this time, the standard time is 13:00.

A message format in the CDMA system is shown in FIG. 7. Referring to FIG. 7, MSG_TYPE is a message type field, P_REV is a protocol revision level, MIN_P_REV is a minimum protocol revision level, SID is a system identification number, NID is a network identification number, PILOT_PN is a pilot PN series offset index, LC_STATE is a long code state, and SYS_TIME is a system time. LP_SEC is a number of leap seconds after the system time starts, and LTM_OFF is an offset time of the local time with respect to the system time. DAYLT has one bit, PRAT has two bits and CDMA_FREQ is a used frequency.

In the CDMA system, also, the portable remote telephone terminal is supplied with the system identification number SID. The system time SYS_TIME is a count value, increasing by 80 milliseconds, starting from 00:00:00 on Jan. 6, 1980 (which is equal to the starting time of GPS (Global Positioning System)). The offset time LTM_OFF is represented by a complement of "2" having units of 30 minutes. The leap time corresponds to a correct time of the system time. Thus, in the portable remote telephone terminal for the CDMA system, the present time is calculated in accordance with the following formula.

$$SYS\_TIM-(LP\_SEC \times 12.5)+(LTM\_OFF \times 22500)$$

Such a calculation can be carried out by the processor 1 (see FIG. 1).

A second example of the process corresponds to a case where services of both the AMPS system and the CDMA system are supplied to each portable remote telephone terminal. In the AMPS system, the time information is not supplied. On the other hand, in the CDMA system, the time information is supplied. A portable remote telephone terminal used in this case operates in a dual mode. In the dual mode, the operation is selectively switched so as to be applied to either the AMPS system or the CDMA system. Even if the operation for the AMPS system is selected, the time can be automatically set. In this case, the radio unit 9 has modulating-demodulating units for the AMPS system and the CDMA system which are selectable so that signals can be received and transmitted in the AMPS system and the CDMA system.

Figure 8:
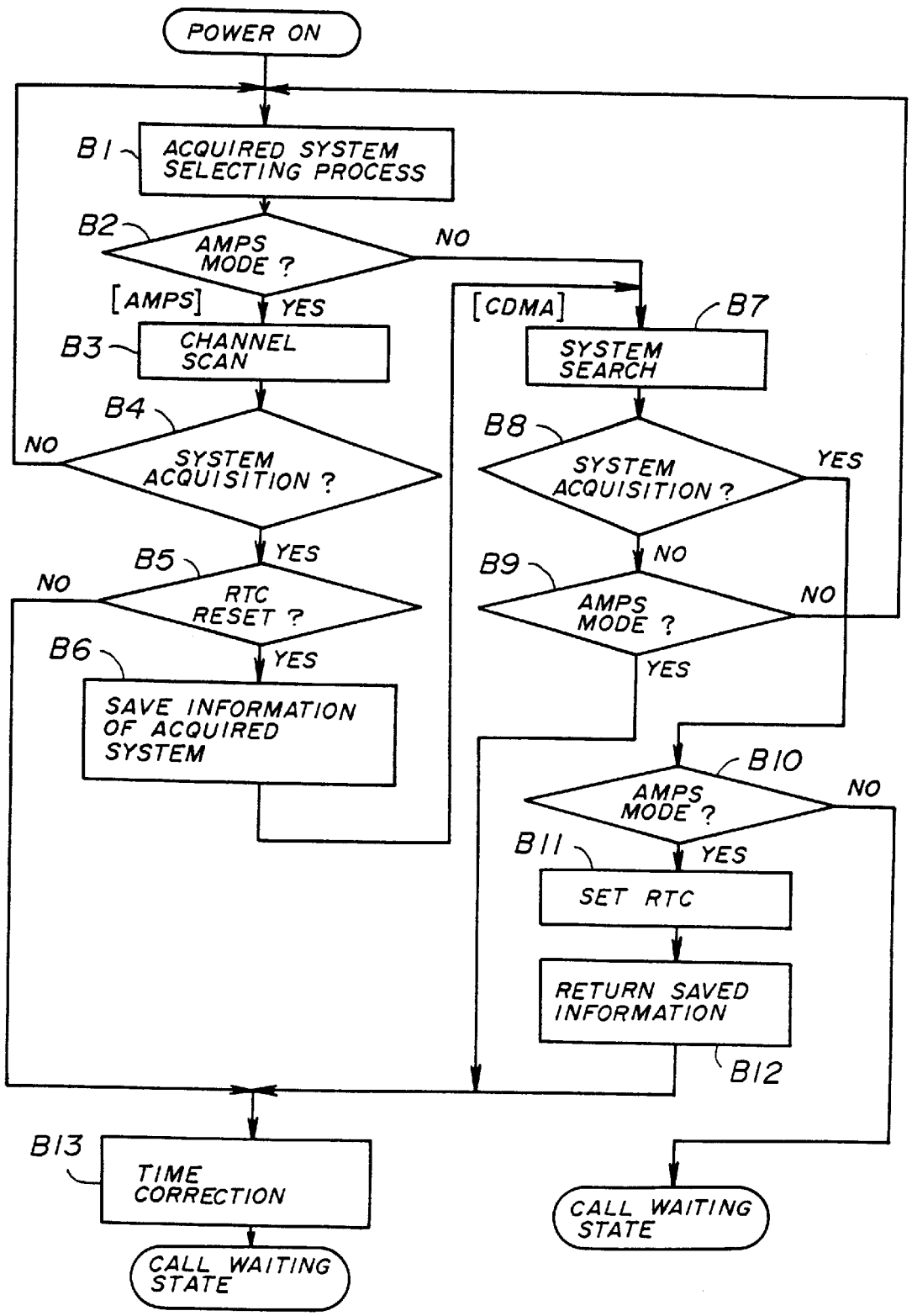
FIG. 8 is a flowchart illustrating a second example of the process carried out in the portable remote telephone terminal.

The second example of the process in the dual mode is carried out in accordance with a procedure as shown in FIG. 8. Referring to FIG. 8, after the power switch of the portable remote telephone terminal is turned on, an acquired system selecting process is carried out (B1). That is, either the AMPS system or the CDMA system is selected as the system which should be acquired, or a system A or a system B is selected in the AMPS system and the CDMA system. It is then determined whether the AMPS mode or the CDMA mode (B2) is selected. If the AMPS mode is selected, a channel scanning process is carried out to receive the notifying information from a base station of the AMPS system (the system acquisition)(B3).

Due to the channel scanning process, it is determined whether the system acquisition has been established (B4). If the system acquisition has not been established, the process returns to the step (B1). On the other hand, if the system acquisition is established, it is determined whether the real time clock unit (RTC) has been reset (B5). In a case where the real time clock unit (RTC) does not normally start operating and has been reset, information about a channel number and an identification number which has been acquired at this time is saved (B6). On the other hand, if the real time clock (RTC) has not been reset, the time correcting process is carried out (B13) and the terminal becomes in the call waiting state. The time correcting process includes steps corresponding to the steps (A2)–(A6) shown in FIG. 6.

After the real time clock unit (RTC) is reset and the information of the acquired system is saved, the mode is switched to a mode for the CDMA system and the system search is carried out (B7). It is then determined whether the system acquisition is established, that is, whether notifying information from a base station of the CDMA system is received (B8). If the system acquisition is not established, it is determined that the user is out of the area for the CDMA system. It is then determined that the AMPS mode has been selected in the acquired system selecting process in step (B1) (B9). If the AMPS mode has been selected, the process proceeds to the call waiting state through step B13. On the other hand, if it is determined, in step B9, that the AMPS mode has not been selected, the process returns to step B1.

If the system acquisition is established in step B8, it is determined whether the selecting process in step B1 has been carried out to select the AMPS mode (B10). If the selecting process has not been carried out to select the AMPS mode, the terminal determines that the selecting process has been carried out to select the CDMA mode and the process proceeds to the call waiting state. On the other hand if the selecting process has been carried out to select the AMPS mode, a setting process for the real time clock unit (RTC) is carried out (B11). That is, the system time SYS_TIME, the number of leap seconds LP_SEC and the offset time LTM_OFF which are shown as the message format in FIG. 7 are extracted, and the time is calculated in accordance with the above formula. The calculated time is then set in the real time clock unit (RTC). The system information which has been saved in step B6 is returned (B12). The process then proceeds to the call waiting state through step B13.

Thus, in the portable remote telephone terminal in the dual mode, the system time SYS_TIME, the number of leap seconds LP_SEC and the offset time LTM_OFF are extracted from the signal, having the message format shown in FIG. 7, transmitted from the based station in the CDMA system. Using the extracted information, the present time is calculated and set. After this, for example, the system identification number SID1 shown in FIG. 4 in the AMPS system is extracted, and the time correction is carried out with reference to the time differential table 2A.

The present invention is not limited to the aforementioned embodiments, and other variations and modifications may be made without departing from the scope of the claimed invention.

What is claimed is:

1. A time correcting method of a portable remote telephone terminal, comprising steps of:
   (a) receiving notifying information from a base station, the notifying information including an identification number identifying said base station;
   (b) selecting a time differential information item corresponding to the identification number from a table which indicates a relationship between identification numbers identifying base stations and time differential information items in service areas of said respective base stations; and
   (c) correcting a present time using the time differential information item selected in step (b), wherein said steps (a) to (c) are performed within one portable remote telephone terminal and wherein a time at which a previous time correcting operation in the step (c) is performed is stored, comparison is made between the thus-stored time and a time at which a current time correcting operation in the step (c) is to be performed, and, when the time difference therebetween is within a predetermined time, the current time correcting operation is not performed.

2. The method claimed in claim 1, wherein each of the time differential information items corresponds to a difference between a standard time and a local time in a corresponding one of the service areas of said base stations, and wherein said step (c) comprises steps of:
   (c-1) calculating a difference between a first time differential information item selected in step (b) and a second time differential information item which has been used to correct the present time; and
   (c-2) adding or subtracting the difference calculated in step (c-1) to or from the present time which has been corrected using the second time differential item.

3. The method as claimed in claim 1, wherein the time correction operation is performed only when the time differential information obtained in the current time correction operation differs from that obtained in the previous time correction operation.

4. A portable remote telephone terminal which receives notifying information from a base station and has a timer, the notifying information including an identification number identifying the base station, comprising:
   a table indicating a relationship between identification numbers identifying base stations and time differential information items in service areas of said respective base stations;
   selecting means for selecting a time differential information item corresponding to the identification number included in the received notifying information from said table; and
   correcting means for correcting a present time of said timer using the time differential information item selected by said selecting means,
wherein a time at which a previous time correcting operation is performed by said correcting means is stored, comparison is made between the thus-stored time and a time at which a current time correcting operation is to be performed by said correcting means, and, when the time difference therebetween is within a predetermined time, the current time correcting operation is not performed.

5. The portable remote telephone terminal as claimed in claim 4, wherein each of the time differential information items corresponds to a difference between a standard time and a local time in a corresponding one of the service areas of said base stations, and wherein said corresponding means comprises:
   first calculating means for calculating a difference between a first time differential information item selected by said selecting means and a second time differential information item which has been used to correct the present time; and
   second calculating means for adding or subtracting the difference calculated by said first calculating means to or from the present time which has been corrected using the second time differential item.

6. The method as claimed in claim 4, wherein the time correction operation is performed only when the time differential information obtained in the current time correction operation differs from that obtained in the previous time correction operation.

7. A portable remote telephone terminal which receives notifying information from a base station, has a timer and functions in a dual mode, the dual mode being a mode in which a first system supplying time information and a second system not supplying the time information are selectable, said portable remote telephone terminal comprising:
   a table indicating a relationship between identification numbers identifying base stations and time differential information items in service areas of said respective base stations, each of the time differential information items being a difference between a standard time and a local time in a corresponding one of the service areas of said respective base stations;
   storage means for storing time difference information indicating a difference between a present time set in said timer and the standard time;
   receiving means for receiving the time information supplied in the first system to which the second system selected immediately after turning on a power supply is switched;
   time setting means for setting a present time based on the time information received by said receiving means;
   mode switch-back means for switching the first system back to the second system;
   selecting means for selecting from said table a time differential information item corresponding to the identification number included in the notifying information received in the second system; and
   correcting means for correcting a present time of said timer using a difference between the time difference information item selected by said selecting means and the time differential information stored in said storage means,
wherein a time at which a previous time correcting operation is performed by said correcting means is stored, comparison is made between the thus-stored time and a time at which a current time correcting operation is to be performed by said correcting means, and, when the time difference therebetween is within a predetermined time, the current time correcting operation is not performed.

8. The method as claimed in claim 7, wherein the time correction operation is performed only when the time differential information obtained in the current time correction operation differs from that obtained in the previous time correction operation.

9. A portable remote telephone terminal which receives notifying information from a base station and has a timer, the notifying information including an identification number identifying the base station, comprising:

- a table indicating a relationship between identification numbers identifying base stations and time differential information items in service areas of said respective base stations;
- a selecting unit selecting a time differential information item corresponding to the identification number included in the received notifying information from said table; and
- a correcting unit correcting a present time of said timer using the time differential information item selected by said selecting unit, wherein a time at which a previous time correcting operation is performed by said correcting unit is stored, comparison is made between the thus-stored time and a time at which a current time correcting operation is to be performed by said correcting unit, and, when the time difference therebetween is within a predetermined time, the current time correcting operation is not performed.

10. The portable remote telephone terminal as claimed in claim 9, wherein each of the time differential information items corresponds to a difference between a standard time and a local time in a corresponding one of the service areas of said base stations, and wherein said correcting unit comprises:

- a first calculating unit calculating a difference between a first time differential information item selected by said selecting unit and a second time differential information item which has been used to correct the present time; and
- a second calculating unit adding or subtracting the difference calculated by said first calculating unit to or from the present time which has been corrected using the second time differential item.

11. The method as claimed in claim 9, wherein the time correction operation is performed only when the time differential information obtained in the current time correction operation differs from that obtained in the previous time correction operation.

12. A portable remote telephone terminal which receives notifying information from a base station, has a timer and functions in a dual mode, the dual mode being a mode in which a first system supplying time information and a second system not supplying the time information are selectable, said portable remote telephone terminal comprising:

- a table indicating a relationship between identification numbers identifying base stations and time differential information items in service areas of said respective base stations, each of the time differential information items being a difference between a standard time and a local time in a corresponding one of the service areas of said respective base stations;
- a register storing time difference information indicating a difference between a present time set in said timer and the standard time;
- a receiving unit receiving the time information supplied in the first system to which the second system selected immediately after turning on a power supply is switched;
- a time setting unit setting a present time based on the time information received by said receiving unit;
- a mode switch-back unit switching the first system back to the second system; and
- a selecting unit selecting from said table a time differential information item corresponding to the identification number included in the notifying information received in the second system; and
- a correcting unit correcting a present time of said timer using a difference between the time difference information item selected by said selecting unit and the time differential information stored in said register, wherein a time at which a previous time correcting operation is performed by said correcting unit is stored, comparison is made between the thus-stored time and a time at which a current time correcting operation is to be performed by said correcting unit, and, when the time difference therebetween is within a predetermined time, the current time correcting operation is not performed.

13. The method as claimed in claim 12, wherein the time correction operation is performed only when the time differential information obtained in the current time correction operation differs from that obtained in the previous time correction operation.

* * * * *